United States Patent

Kanou

(10) Patent No.: US 10,005,457 B2
(45) Date of Patent: Jun. 26, 2018

(54) DRIVING FORCE CONTROL DEVICE FOR A VEHICLE

(71) Applicant: TOYOTA JIDOSHA KABUSHIKI KAISHA, Toyota-shi, Aichi (JP)

(72) Inventor: Takeshi Kanou, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 161 days.

(21) Appl. No.: 15/266,383

(22) Filed: Sep. 15, 2016

(65) Prior Publication Data

US 2017/0113681 A1    Apr. 27, 2017

(30) Foreign Application Priority Data

Oct. 27, 2015 (JP) .................. 2015-211302

(51) Int. Cl.
*B60W 30/02* (2012.01)
*F16H 63/50* (2006.01)
*B60W 30/20* (2006.01)

(52) U.S. Cl.
CPC .......... *B60W 30/02* (2013.01); *B60W 30/025* (2013.01); *B60W 30/20* (2013.01);
(Continued)

(58) Field of Classification Search
CPC ..... B60W 2510/1005; B60W 2510/22; B60W 2520/16; B60W 2540/10; B60W 2710/0666; B60W 2710/083; B60W 2710/105; B60W 2710/226; B60W 30/02; B60W 30/025; B60W 30/20; B60W 10/22; B60W 10/04; B60W 10/06; B60W 2720/16; B60W 40/11; B60Y 2300/0207; F16H 63/50; B60G 2800/162

See application file for complete search history.

(56) References Cited

U.S. PATENT DOCUMENTS 8,825,291 B2   9/2014 Oikawa
9,079,579 B2   7/2015 Kikuchi et al.
(Continued)

FOREIGN PATENT DOCUMENTS

JP   2006069472 A   3/2006
JP   2008231989 A   10/2008
(Continued)

OTHER PUBLICATIONS

U.S. Appl. No. 15/261,338, filed Sep. 9, 2016 in the name of Momose.

*Primary Examiner* — Khoi H Tran
*Assistant Examiner* — Robert T Nguyen
(74) *Attorney, Agent, or Firm* — Oliff PLC (57) ABSTRACT

A vibration suppression torque calculation means calculates a vibration suppression torque for suppressing a sprung vibration. An upper/lower limit value setting means is configured to set, based on a gear ratio of a transmission, upper and lower limit values whose absolute values are increased as the gear ratio is increased. An upper/lower limit restriction means calculates a final vibration suppression torque acquired by using the upper and lower limit values to impose upper/lower limit restriction on the vibration suppression torque. An addition unit sets a value acquired by adding the final vibration suppression torque to a driver required torque to a target torque.

2 Claims, 6 Drawing Sheets

(52) U.S. Cl.
CPC ..... *F16H 63/50* (2013.01); *B60W 2510/1005* (2013.01); *B60W 2520/16* (2013.01); *B60W 2540/10* (2013.01); *B60W 2710/0666* (2013.01); *B60W 2710/083* (2013.01); *B60Y 2300/207* (2013.01)

(56) References Cited

U.S. PATENT DOCUMENTS

| | | |
|---|---|---|
| 9,187,080 B2 | 11/2015 | Kikuchi et al. |
| 9,238,462 B2 | 1/2016 | Kikuchi et al. |
| 9,452,653 B2 | 9/2016 | Kikuchi et al. |
| 2006/0052908 A1 | 3/2006 | Matsumoto et al. |
| 2009/0203481 A1* | 8/2009 | Nohara ................. B60K 6/365 475/150 |
| 2011/0213527 A1 | 9/2011 | Itabashi et al. |
| 2011/0266760 A1 | 11/2011 | Itabashi |
| 2012/0010169 A1 | 1/2012 | Teshigawara et al. |
| 2012/0101691 A1 | 4/2012 | Otsuka et al. |
| 2013/0231838 A1 | 9/2013 | Shiozawa et al. |
| 2015/0183429 A1* | 7/2015 | Shiozawa ............. B60W 10/06 701/48 |
| 2016/0114644 A1 | 4/2016 | Morita |
| 2017/0036669 A1 | 2/2017 | Kanou et al. |
| 2017/0113681 A1 | 4/2017 | Kanou |

FOREIGN PATENT DOCUMENTS

| | | |
|---|---|---|
| JP | 2010132254 A | 6/2010 |
| JP | 2011017303 A | 1/2011 |
| JP | 2012047553 | 3/2012 |
| WO | 2010050070 A1 | 5/2010 |

\* cited by examiner

DRIVING FORCE CONTROL DEVICE FOR A VEHICLE

BACKGROUND OF THE INVENTION

1. Field of the Invention

The present invention relates to a driving force control device for a vehicle, which is configured to control driving forces to be generated on wheels so that a sprung vibration can be suppressed.

2. Description of the Related Art

Hitherto, there has been known a driving force control device configured to control driving forces to be generated on wheels, to thereby suppress a vibration of a vehicle body, namely, a sprung vibration. Control of suppressing the sprung vibration is referred to as sprung vibration damping control. When the sprung vibration damping control is carried out, the driving force control device calculates a vibration suppression torque, which acts in a direction of suppressing the sprung vibration (e.g., a pitch vibration of the vehicle body), sets a target torque acquired by adding the vibration suppression torque to a driver required torque, and controls a driving torque, which is generated by a drive device, in accordance with the target torque.

When this sprung vibration damping control is carried out, particularly in a drive device small in a torque capacity, e.g., a drive device used for a small vehicle, a required value required in the sprung vibration damping control may not be accepted, and a limit may thus be imposed on the vibration suppression torque. For example, in a drive device including a gasoline engine small in the displacement, a ratio of the vibration suppression torque to the driving torque that can be generated by the engine is high, and an opening degree change amount of a throttle for suppressing the sprung vibration is thus large. This large change may adversely affect basic control for the engine. Therefore, upper and lower limit values are set for the vibration suppression torque. On this occasion, a reason for using the expression of the upper and lower limit values is that the vibration suppression torque presents a waveform in which a driving force acting in a direction of increasing the driver required torque and a negative driving force (braking force) acting in a direction of decreasing the driver required torque alternately appear. Thus, the upper and lower limit values of the vibration suppression torque can be paraphrased as upper limit values of the respective absolute values of the driving torque acting in the direction of increasing the vibration suppression torque and the negative driving torque acting in the direction of decreasing the vibration suppression torque.

In this way, a technology of setting the upper and lower limit values of the vibration suppression torque is proposed in, for example, Japanese Patent Application Laid-open No. 2011-17303.

However, the setting of the upper and lower limit values of the vibration suppression torque may result in a state where the sprung vibration damping control performance cannot be sufficiently exerted.

SUMMARY OF THE INVENTION

The present invention has been made to cope with the above-mentioned problem, and therefore has an object to exert sprung vibration damping control performance as much as possible even in a case where sprung vibration damping control is carried out while upper and lower limit values of a vibration suppression torque are set.

In order to achieve the above-mentioned object, a feature of one embodiment of the present invention resides in a driving force control device for a vehicle, including:

a drive device (3) including a travel driving source (30) and a transmission (31) and being configured to transmit a driving torque of the travel driving source to a wheel via the transmission, to thereby drive the wheel;

vibration suppression torque calculation means (102) for calculating a vibration suppression torque for suppressing a sprung vibration to be generated on a vehicle body due to input from a road surface;

upper/lower limit restriction means (104) for imposing an upper/lower limit restriction on the calculated vibration suppression torque such that the vibration suppression torque falls within a range limited by upper and lower limit values;

target torque calculation means (105) for calculating a target torque by adding the vibration suppression torque, which is acquired by imposing the upper/lower limit restriction, to a driver required torque, which is set based on an accelerator operation performed by a driver;

driving torque control means (106) for controlling a driving torque of the drive device based on the target torque;

gear ratio acquisition means (103) for acquiring a gear ratio of the transmission at a current time; and upper/lower limit value setting means (103) for setting, based on the acquired gear ratio, absolute values of the upper and lower limit values so as to be increased as the gear ratio is increased.

The driving force control device for a vehicle according to one embodiment of the present invention includes the drive device, the vibration suppression torque calculation means, the upper/lower limit restriction means, the target torque calculation means, the driving torque control means, the gear ratio acquisition means, and the upper/lower limit value setting means.

The drive device includes the travel driving source and the transmission, and is configured to transmit the driving torque of the travel driving source to the wheel via the transmission, to thereby drive the wheel. The vibration suppression torque calculation means is configured to calculate the vibration suppression torque for suppressing the sprung vibration to be generated on the vehicle body. For example, the vibration suppression torque calculation means may be configured to use a sensor to detect an actual vibration state of the vehicle body, and to calculate the vibration suppression torque based on a sensor detection value, or may be configured to use a kinetic model of the vehicle to calculate the vibration suppression torque for minimizing the vibration of the vehicle body.

The upper/lower limit restriction means is configured to impose the upper/lower limit restriction on the calculated vibration suppression torque such that the vibration suppression torque falls within the range limited by the upper and lower limit values. The target torque calculation means is configured to calculate the target torque by adding the vibration suppression torque subjected to the upper/lower limit restriction to the driver required torque, which is set based on the accelerator operation performed by the driver. The driving torque control means is configured to control the driving torque of the drive device based on the target torque. As a result, the vibration (mainly the pitch vibration) of the vehicle body is suppressed. This control for controlling the driving torque of the drive device to suppress the vibration of the vehicle body is referred to as sprung vibration damping control.

When a ratio of the vibration suppression torque to the driving torque that can be generated by the travel driving source is high, performance of the travel driving source may be adversely affected. Therefore, the upper/lower limit restriction means imposes the upper/lower limit restriction on the vibration suppression torque, but when the upper/lower limit restriction is not appropriately set, performance of the sprung vibration damping control is decreased.

The driving torque output by the travel driving source is amplified based on the gear ratio of the transmission. Thus, when the upper/lower limit restriction imposed on the vibration suppression torque is set depending on the current gear ratio of the transmission for carrying out the sprung vibration damping control, the performance of the sprung vibration damping control can be exerted as much as possible.

In a related-art device, the upper and lower limit values of the vibration suppression torque are fixed to constant values. In the related-art device, the upper and lower limit values corresponding to the highest gear position having the lowest gear ratio are set so as to secure the performance of the travel driving source independently of the set gear position of the transmission. As a result, for example, when the vehicle is traveling at a low speed gear position where the gear ratio is high, despite that the ratio of the vibration suppression torque to the driving torque that can be output by the travel driving source is small, the upper/lower limit restriction imposed on the vibration suppression torque is not relaxed, and thus the sprung vibration damping control performance may not by sufficiently exerted.

Thus, according to the present invention, the gear ratio acquisition means is configured to acquire the gear ratio of the transmission at the current time. Then, the upper/lower limit value setting means is configured to set, based on the acquired gear ratio, the absolute values of the upper and lower limit values so as to be increased as the gear ratio is increased. Thus, the upper/lower limit restriction imposed on the vibration suppression torque can be greatly relaxed as the gear ratio is increased. As a result, according to the present invention, while the performance of the travel driving source is secured, the sprung vibration damping control performance can be exerted as much as possible.

Further, a feature of one embodiment of the present invention resides in that the upper/lower limit value setting means is configured to set the upper and lower limit values respectively by multiplying driving source vibration suppression torque upper and lower limit values, which are upper and lower limit values of the vibration suppression torque permitted to be generated in the travel driving source, by the acquired gear ratio.

According to the one embodiment of the present invention, the driving source vibration suppression torque upper and lower limit values, which are the upper and lower limit values of the vibration suppression torque permitted to be generated in the travel driving source, are determined, and the upper and lower limit values of the vibration suppression torque are set by respectively multiplying the driving source vibration suppression torque upper and lower limit values by the gear ratio. Thus, according to the one embodiment of the present invention, the upper and lower limit values can appropriately be set. As a result, while the performance of the travel driving source is secured, the sprung vibration damping control performance can be exerted more appropriately.

In the description above, a reference symbol used in an embodiment of the present invention is enclosed in parentheses and assigned to each constituent feature of the invention corresponding to the embodiment in order to facilitate the understanding of the invention, but each constituent feature of the invention is not limited to that of the embodiment prescribed by the reference symbol.

DETAILED DESCRIPTION OF THE PREFERRED EMBODIMENTS

Figure 1:
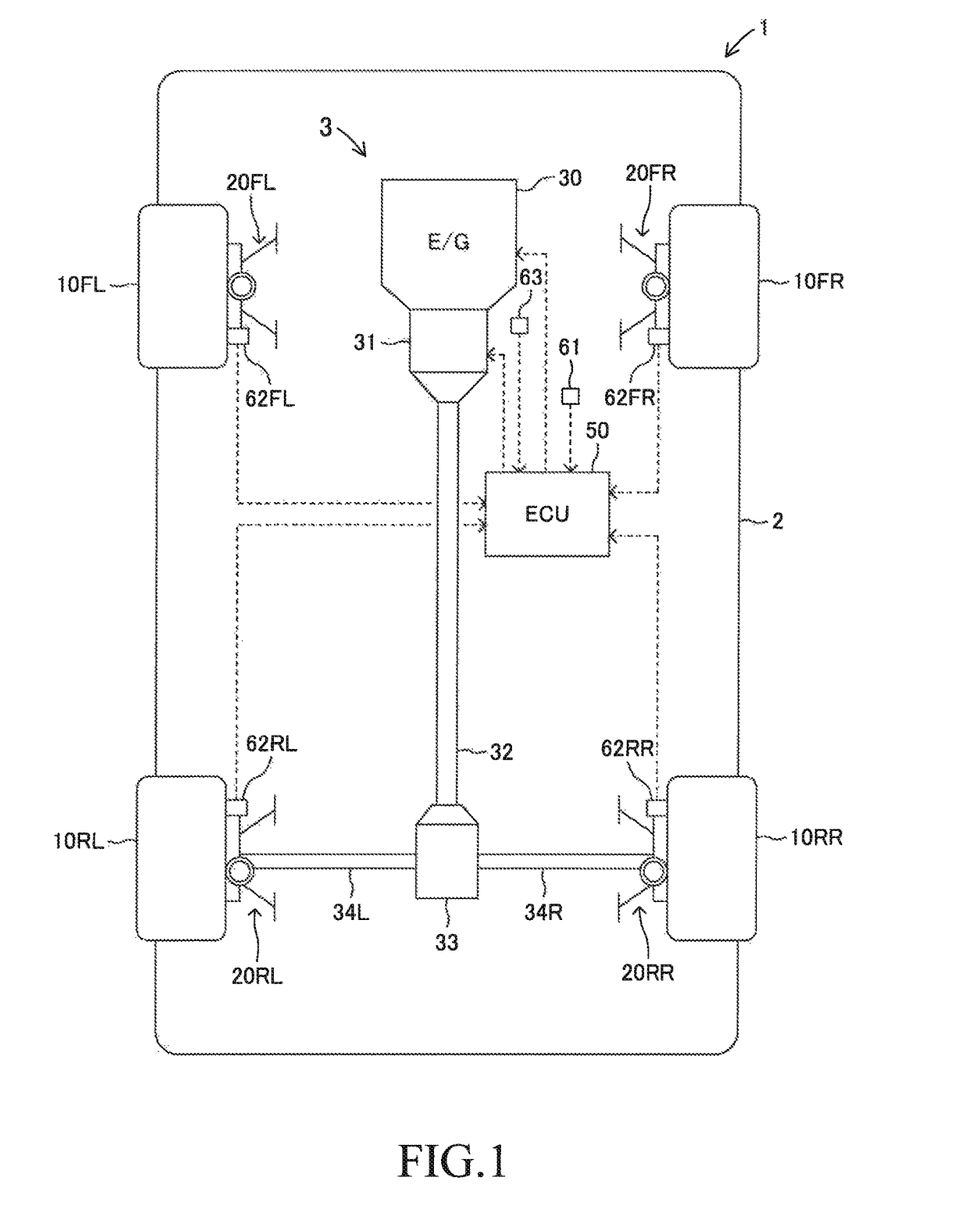
FIG. 1 is a schematic configuration diagram of a vehicle on which a driving force control device for a vehicle according to an embodiment of the present invention is installed.

A detailed description is now given of an embodiment of the present invention referring to the drawings. FIG. 1 is a schematic illustration of a configuration of a vehicle 1 on which a driving force control device for a vehicle according to this embodiment is installed.

The vehicle 1 includes a front left wheel 10FL, a front right wheel 10FR, a rear left wheel 10RL, and a rear right wheel 10RR. The front left wheel 10FL, the front right wheel 10FR, the rear left wheel 10RL, and the rear right wheel 10RR are suspended to a vehicle body 2 via independent suspensions 20FL, 20FR, 20RL, and 20RR, respectively.

The suspensions 20FL, 20FR, 20RL, and 20RR include suspension arms (link mechanisms) configured to couple the vehicle body 2 and the wheels 10FL, 10FR, 10RL, and 10RR to each other, respectively, suspension springs configured to support loads in a vertical direction and absorb impact, and shock absorbers configured to attenuate a vibration of a sprung (vehicle body 2). A publicly known four-wheel independent suspension such as a wishbone type suspension and a strut type suspension can be used as the suspensions 20FL, 20FR, 20RL, and 20RR.

In the following, when a specific one of the respective wheels 10FL, 10FR, 10RL, and 10RR, and/or a specific one of the respective suspensions 20FL, 20FR, 20RL, and 20RR does not need to be identified, the wheels and the suspensions are collectively referred to as wheel 10 and suspension 20, respectively. Moreover, the wheels 10FL and 10FR are referred to as front wheels 10F, and the wheels 10RL and 10RR are referred to as rear wheels 10R.

The vehicle 1 according to this embodiment is a rear wheel drive vehicle, and includes an engine 30 as a travel driving source. As the engine 30, a gasoline engine is used in this embodiment, but a diesel engine or the like can also be applied. The vehicle 1 may be an electric vehicle including a motor in place of the engine as the travel driving source, a hybrid vehicle including a combination of the engine and the motor, or the like. Moreover, the vehicle 1 is not limited to the rear wheel drive vehicle, and may be a front wheel drive vehicle or a four wheel drive vehicle.

Now, a description is given of a driving force control device for a vehicle including the engine 30 as the travel driving source, but the expression of the engine 30 herein can be replaced by the expression of the travel driving source. Moreover, a sensor relating to the engine 30, a sensor value detected by the sensor, an actuator configured to operate the engine, and the like can be replaced by expressions of a sensor relating to the travel driving source used in place of the engine 30, a sensor value detected by the sensor, and an actuator configured to operate the travel driving source.

A driving torque of the engine 30 is transmitted to a propeller shaft 32 via a transmission 31. The torque of the propeller shaft 32 is transmitted to the rear wheels 10RL and 10RR via a differential device 33 and drive shafts 34L and 34R. A drive system in which a driving torque of the engine 30 is transmitted to the rear wheels 10RL and 10RR is a drive device 3. Thus, the drive device 3 includes the engine 30, the transmission 31, a propeller shaft 32, a differential device 33, and drive shafts 34L and 34R. According to this embodiment, the transmission 31 is an automatic transmission, but the transmission 31 may be a manual transmission.

The engine 30 and the transmission 31 are connected to an electric control unit (ECU) 50. The ECU 50 includes a microcomputer as a main component. In this specification, the microcomputer includes a CPU and storage devices, e.g., a ROM and a RAM.

To the ECU 50, an accelerator pedal sensor 61, wheel speed sensors 62FL, 62FR, 62RL, and 62RR, and an engine state sensor 63 are connected. The accelerator pedal sensor 61 is configured to detect an accelerator operation amount, which is an amount of a depressing operation and a return operation on the accelerator pedal by the driver, and to output a detection signal representing the accelerator operation amount to the ECU 50. The wheel speed sensors 62FL, 62FR, 62RL, and 62RR are respectively provided on the wheels 10FL, 10FR, 10RL, and 10RR, and are configured to detect the respective wheel speeds, and to output detection signals representing each of the wheel speed to the ECU 50. The four wheel speed sensors 62FL, 62FR, 62RL, and 62RR are hereinafter collectively referred to as wheel speed sensor 62.

The engine state sensor 63 includes a plurality of sensors configured to detect states of the engine 30 and the transmission 31, and to respectively output detection signals representing detection values to the ECU 50. For example, the engine state sensor 63 is configured to detect an engine rotational speed, a coolant temperature, an intake air temperature, an intake air pressure, the atmospheric pressure, a throttle opening degree, a shift position, rotational speeds of an input shaft and an output shaft of the transmission 31, a shift gear position, and the like.

The ECU 50 is configured to operate, based on detection signals output from those sensors, engine control actuators and transmission control actuators (not shown), thereby controlling the driving torque of the engine 30 and the gear ratio (gear position) of the transmission 31.

The vehicle 1 includes a steering device configured to adjust a steered angle of steered wheels, and a brake device configured to generate friction braking forces on the wheels, but the steering device and the brake device do not directly relate to the present invention, and thus in this specification and the drawings description(s) thereof is omitted.

A description is now given of sprung vibration damping control carried out by the ECU 50. When the drive device 3 is operated based on the driver required drive, and a fluctuation of the wheel torque is caused, a bounce vibration in a vertical direction of the center of gravity of the vehicle body and a pitch vibration in a pitch direction about the center of gravity of the vehicle body may be generated. Moreover, when disturbance caused by irregularities of a road surface or the like acts on the wheel 10 during the travel of the vehicle 1, the disturbance may be transmitted to the vehicle body 2, and the bounce vibration and the pitch vibration may also be generated on the vehicle body. Those vibrations of the vehicle body are referred to as sprung vibrations. The sprung vibration occurs with a frequency in the vicinity of a sprung resonance frequency (e.g., 1.51 Hz).

For the sprung vibration, a force in a direction of suppressing the sprung vibration can be generated on the vehicle body 2 by changing the driving torque (driving forces to be generated on the wheels) of the engine 30 synchronously with the sprung vibration. Thus, the ECU 50 is configured to set, to a target torque, a value acquired by adding a vibration suppression torque for suppressing the sprung vibration to a driver required torque. The ECU 50 is configured to then control the driving torque of the engine 30 so that the wheels 10 generate the target torque. The sprung vibration damping control by using the driving torque is particularly effective for the suppression of the pitch vibration of the vehicle body, and, thus, the sprung vibration damping control only needs to suppress at least the pitch vibration.

For example, when the vehicle body 2 pitches toward a direction of nose-down, the vibration suppression torque toward a direction of accelerating the vehicle is set. As a result, the pitch moment can be applied to the vehicle body 2 toward a direction of nose-up. Similarly, when the vehicle body 2 pitches toward the direction of the nose-up, the vibration suppression torque (braking torque) toward a direction of deceleration the vehicle is set. As a result, the pitch moment can be applied to the vehicle body 2 toward the direction of the nose-down. Thus, the vibration suppression torque for suppressing the sprung vibration pulsates toward the positive and negative directions in synchronous with the sprung vibration.

Figure 2:
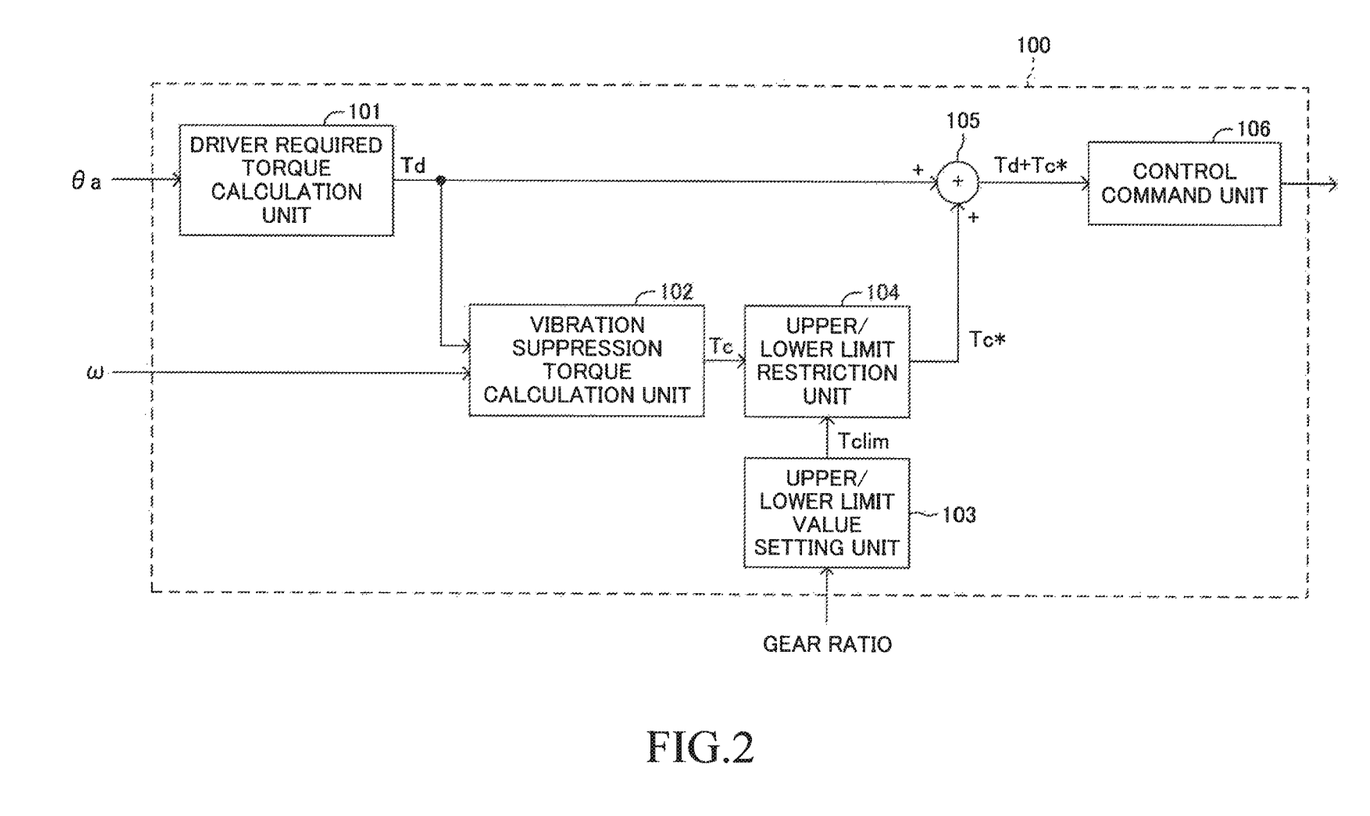
FIG. 2 is a functional block diagram of a driving force control unit.

FIG. 2 is an illustration of functional blocks of a driving force control unit 100 of the ECU 50. The respective blocks in the driving force control unit 100 are implemented by the CPU of the microcomputer provided in the ECU 50 executing instructions (programs) stored in the ROM.

The driving force control unit 100 includes a driver required torque calculation unit 101, a vibration suppression torque calculation unit 102, an upper/lower limit value setting unit 103, an upper/lower limit restriction unit 104, an addition unit 105, and a control command unit 106.

The driver required torque calculation unit 101 is configured to calculate a driver required torque Td, which is a target output torque of the drive device 3 required by the driver, based on an accelerator operation amount ea detected by the accelerator pedal sensor 61, which represents a driver required acceleration/deceleration. The driver required torque calculation unit 101 is, for example, configured to store a driver required torque map for setting the driver required torque Td that is increased as the accelerator operation amount ea is increased, and to use this driver required torque map to calculate the driver require torque Td. The driver required torque calculation unit 101 is configured to output a signal representing the calculated driver required torque Td to the vibration suppression torque calculation unit 102 and the addition unit 105. The ECU 50 is configured to control the gear position of the transmission 31 based on the accelerator operation amount θa (or the accelerator operation amount ea and the vehicle speed) in a gear ratio control functional unit (not shown) in parallel with the processing of calculating the driver required torque Td by the driver required torque calculation unit 101.

The vibration suppression torque calculation unit 102 is a functional unit configured to calculate a correction torque (sprung vibration damping control amount) for correcting the driver required torque Td so as to minimize the sprung vibration (vibration of the vehicle body 2). The correction torque calculated by the vibration suppression torque calculation unit 102 is referred to as a vibration suppression torque Tc. Various methods are known as a method of calculating the vibration suppression torque Tc, and an arbitrary one of the various methods can be selected.

According to this embodiment, the vibration suppression torque calculation unit 102 has the same configuration as that of, for example, the "damping control device" disclosed in Japanese Patent Application Laid-open No. 2008-231989 (Japanese Patent No. 4835480) applied by the applicant of the subject application. Thus, various calculation methods disclosed in Japanese Patent Application Laid-open No. 2008-231989 may be herein incorporated (namely, the methods should be treated as being disclosed in this specification).

Figure 3:
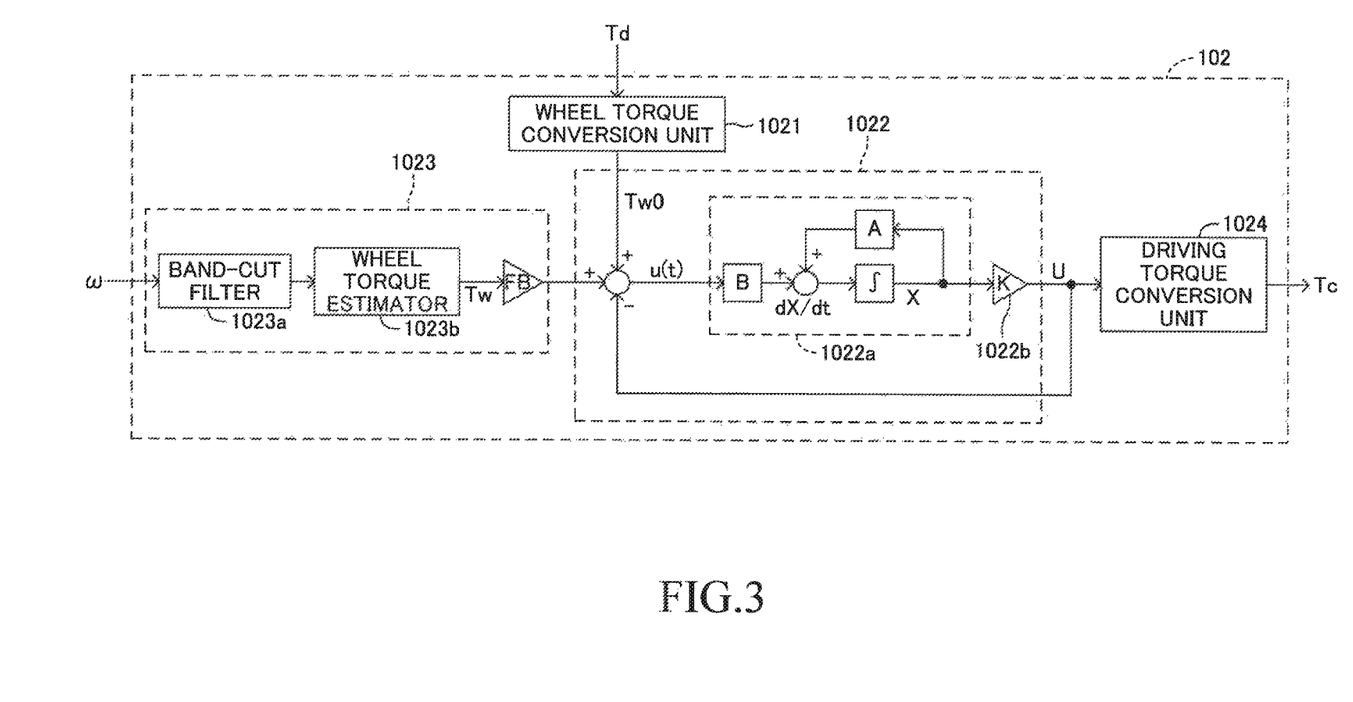
FIG. 3 is a diagram for illustrating control blocks of a vibration suppression torque calculation unit.

FIG. 3 is a diagram for schematically illustrating the configuration of the vibration suppression torque calculation unit 102 in a form of control blocks. The vibration suppression torque calculation unit 102 includes a wheel torque conversion unit 1021, a feedforward control unit 1022, a feedback control unit 1023, and a driving torque conversion unit 1024.

The wheel torque conversion unit 1021 is configured to convert the driver required torque Td into a wheel torque, and to supply a signal representing a driver required wheel torque Two, which is a converted value of the driver required torque Td, to the feedforward control unit 1022. The feedforward control unit 1022 has a configuration of the so-called optimal regulator. The feedforward control unit 1022 includes a kinetic model unit 1022a in which a kinetic model of the sprung vibration of the vehicle body is built. The driver required wheel torque Two is input to the kinetic model unit 1022a. In the kinetic model unit 1022a, responses of state variables of the vehicle body to the input driver required wheel torque Two are calculated. In a correction amount calculation unit 1022b, a correction amount of the driver required wheel torque for causing the state variables to converge to the minimums is calculated.

Wheel speeds w (wheel rotational speeds) detected by the wheel speed sensors 62RL and 62RR of the drive wheels 10R are input to the feedback control unit 1023, and the wheel speeds w are filtered by a band-cut filter 1023a. As a result, a frequency component of a noise vibration that does not contribute to the sprung vibration damping control is removed from the wheel speed w. The filtered wheel speeds w are supplied to a wheel torque estimator 1023b. The wheel torque estimator 1023b is configured to calculate an estimated wheel torque Tw from a time derivative of the wheel speed (wheel rotational speed) w, the mass M of the vehicle, and a wheel radius r in accordance with the following expression.

$$Tw = M \cdot r^2 \cdot d\omega/dt$$

Further, the feedback control unit 1023 is configured to multiply the estimated wheel torque Tw by an FB gain. The FB gain is a gain for adjusting a contribution balance between the driver required wheel torque and the estimated wheel torque in the kinetic model unit 1022a. A value acquired by multiplying the estimated wheel torque Tw by the FB gain is added as disturbance input to the driver required wheel torque Two, and the sum is input to the kinetic model unit 1022a. As a result, in the feedforward control unit 1022, a correction amount for the driver required wheel torque Two reflecting the disturbance can be calculated. In the following, the value acquired by multiplying the estimated wheel torque Tw by the FB gain is paraphrased as the estimated wheel torque Tw.

In the driving torque conversion unit 1024, the correction amount for the driver required wheel torque Two is converted into a value in a unit of the required torque of the drive device 3. This converted value is a vibration suppression torque required to prevent the sprung vibration from being generated.

The vibration suppression torque calculation unit 102 assumes a dynamic kinetic model in the bounce direction and the pitch direction of the vehicle body, and constructs a state equation, to which the driver requested wheel torque Two and the estimated wheel torque Tw (disturbance) are input, and includes state variables in the bounce direction and the pitch direction. The vibration suppression torque calculation unit 102 is configured to determine input (torque value) that causes the state variables in the bounce direction and the pitch direction to converge to zero through the optimal regulator theory from this state equation. This torque value is used as the torque for the sprung vibration damping control, namely, the vibration suppression torque Tc for correcting the driver required torque Td. The direction (positive/negative) of the vibration suppression torque Tc is determined so that the sprung vibration is suppressed when the vibration suppression torque Tc is added to the driver required torque Td.

Figure 4:
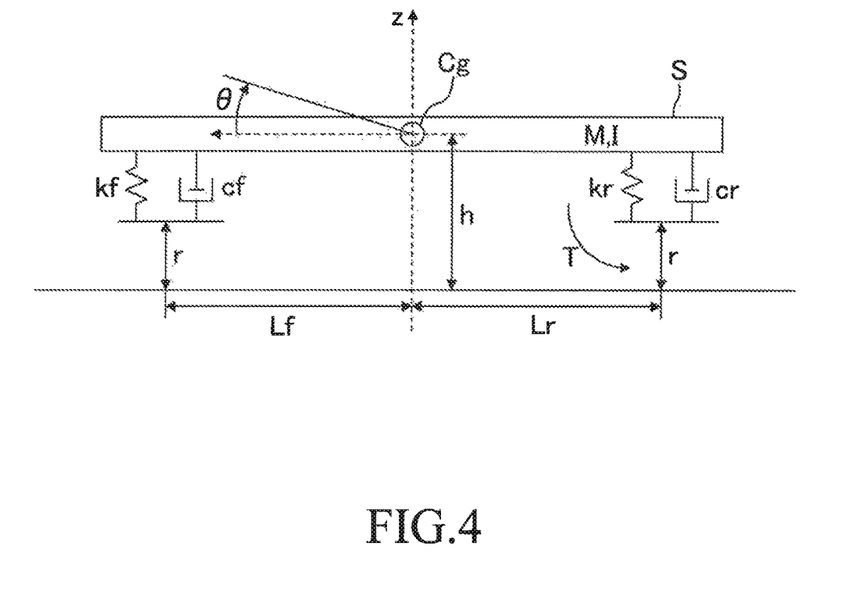
FIG. 4 is a diagram for illustrating a dynamic vehicle kinetic model.

As the above-mentioned kinetic model, there may be given, for example, as illustrated in FIG. 4, a model in which the vehicle body 2 is considered as a rigid body S having a mass M and a moment of inertia I, and the rigid body S is supported by a front wheel suspension 20f having an elastic modulus kf and an attenuation factor cf and a rear wheel suspension 20r having an elastic modulus kr and an attenuation factor cr. In this case, an equation of motion in the bounce direction and an equation of motion in the pitch direction at the vehicle center of gravity Cg are respectively represented as Expression (1a) and Expression (1b).

$$M\frac{d^2z}{dt^2} = -kf(z + Lf \cdot \theta) - cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right) \quad (1a)$$

$$I\frac{d^2\theta}{dt^2} = -Lf\left\{kf(z + Lf \cdot \theta) + cf\left(\frac{dz}{dt} + Lf \cdot \frac{d\theta}{dt}\right)\right\} + Lr\left\{kr(z - Lr \cdot \theta) + cr\left(\frac{dz}{dt} - Lr \cdot \frac{d\theta}{dt}\right)\right\} + \frac{h}{r} \cdot T \quad (1b)$$

In Expressions (1a) and (1b), Lf and Lr respectively denote a distance from the vehicle center of gravity Cg to a front axle and a distance from the vehicle center of gravity Cg to a rear axle, and r denotes a radius of the wheel. Moreover, h denotes a height from the road surface to the vehicle center of gravity Cg. In Expression (1a), a first term and a second term on the right-hand side are components of a force from the front axle, and a third term and a fourth term on the right-hand side are components of a force from the rear axle. Moreover, in Expression (1b), a first term on the right-hand side is a moment component of the force from the front axle. A second term on the right-hand side is a moment component of the force from the rear axle. A third term on the right-hand side is a moment component of a force applied by a wheel torque T(=Tw0+Tw) generated in the drive wheel 10R about the vehicle center of gravity Cg.

Expressions (1a) and (1b) can be rewritten to a form of state equation of a linear system as Expression (2a) where a state variable vector X(t) includes displacements z and θ of the vehicle body 2 and change rates dz/dt and dO/dt of the displacements.

$$dX(t)/dt = A \cdot X(t) + B \cdot u(t) \quad (2a)$$

In Expression (2a), X(t), A, and B are respectively represented as follows.

$$X(t) = \begin{pmatrix} z \\ dz/dt \\ \theta \\ d\theta/dt \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix}$$

The respective elements a1 to a4 and b1 to b4 of the matrix A are represented as follows by collecting coefficients of z, θ, dz/dt, and dθ/dt to Expressions (1a) and (1b).

$$a1 = -(kf + kr)/M$$

$$a2 = -(cf + cr)/M$$

$$a3 = -(kf \cdot Lf - kr \cdot Lr)/M$$

$$a4 = -(cf \cdot Lf - cr \cdot Lr)/M$$

$$b1 = -(Lf \cdot kf - Lr \cdot kr)/I$$

$$b2 = -(Lf \cdot cf - Lr \cdot cr)/I$$

$$b3 = -(Lf^2 \cdot kf + Lr^2 kr)/I$$

$$b4 = -(Lf^2 \cdot cf + Lr^2 - cr)/I$$

Moreover, u(t) of Expression (2a) is represented as follows.

$$u(t) = T$$

Moreover, u(t) is an input to the system represented by Expression (2a).

Thus, an element p1 of the matrix B is represented as follows from Expression (1b).

$$p1 = h/(I \cdot r)$$

In the state equation of Expression (2a), when u(t) is represented as Expression (2b), Expression (2a) is represented as Expression (2c).

$$u(t) = -K \cdot X(t) \quad (2b)$$

$$dX(t)/dt = (A - BK) \cdot X(t) \quad (2c)$$

Thus, when an initial value $X_0(t)$ of X(t) is set as $X_0(t) = (0,0,0,0)$ (it is assumed that the vibration is absent before the torque input), then, a differential equation (Expression (2c)) of the state variable vector X(t) is solved, and, consequently, a gain K that causes X(t), that is, the magnitudes of displacements in the bounce direction and the pitch direction and the temporal change rates of the displacements, to converge to zero is determined, the torque value u(t) for suppressing the sprung vibration is determined.

The gain K can be determined through the optimum regulator theory. With this theory, X(t) stably converges in the state equation (2a) when the value of an evaluation function J (integration range is 0 to ∞) in the quadratic form represented by Expression (3a) becomes minimum.

$$J = 1/2 \cdot (X^T Q X + u^T R u) dt \quad (3a)$$

Moreover, it is known that the matrix K that minimizes the evaluation function J is given as follows.

$$K = R^{-1} \cdot B^T \cdot P$$

On this occasion, P is a solution of a Riccati equation represented as the following expression.

$$dP/dt = A^T \cdot P + PA + Q - PBR^{-1}B^T P$$

This Riccati equation can be solved through an arbitrary method known in the field of the linear system, and, consequently, the gain K is determined.

The evaluation function J and Q and R in the Riccati equation are respectively a symmetric positive semi-definite matrix and a symmetric positive definite matrix that are arbitrarily set, and weighting matrices of the evaluation function J determined by a designer of the system. For example, in the case of this kinetic model, when Q and R are set as follows.

$$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1)$$

and in Expression (3a), the norms (magnitudes) of specific ones (e.g., dz/dt and dθ/dt) of the elements of the state variable vector X(t) are set to be larger than the norms of the other elements (e.g., z and θ), the elements the norms of which are set to be larger relatively more stably converge. Moreover, when the values of the elements of Q are increased, the transition characteristic is emphasized, that is, the values of the state variable vector X(t) quickly converge to stable values. When the value of R is increased, consumed energy is decreased.

In the vibration suppression torque calculation unit 102, the state variable vector X(t) is calculated by the kinetic model unit 1022a using the torque input value to solve the differential equation of Expression (2a). Then, in the correction amount calculation unit 1022b, a value U(t) is calculated, which is acquired by multiplying the state vector X(t), which is the output of the kinetic model unit 1022a, by the gain K determined so as to cause the state variable vector X(t) to converge to zero or the minimum value as described above. The value U(t) is supplied to the driving torque conversion unit 1024. The driving torque conversion unit 1024 converts the value U(t) into the torque of the drive device 3. The converted driving torque is used as the torque for the sprung vibration damping control, namely, the vibration suppression torque Tc for correcting the driver required torque Td. The vibration suppression torque calculation unit 102 outputs the vibration suppression torque Tc to the upper/lower limit restriction unit 104.

In the vibration suppression torque calculation unit 102, a resonance system is constructed, and, thus, the value of the state variable vector X(t) substantially includes only components of the natural frequency of the system for an arbitrary input. Thus, when the torque acquired by adding the vibration suppression torque Tc to the driver required torque Td is set to the target torque, and the driving torque of the engine 30 is controlled so that the drive device 3 generates the target torque, the sprung vibration at the sprung resonance frequency (e.g., 1.5 Hz according to this embodiment) can be suppressed.

Thus, the upper and lower limit values are set to the vibration suppression torque Tc so as to secure basic performance of the engine 30. On this occasion, a reason for using the expression of the upper and lower limit values is that the vibration suppression torque Tc presents a waveform in which a driving force acting in a direction of increasing the driver required torque Td and a negative driving force (braking force) acting in a direction of decreasing the driver required torque Td alternately appear. In the drive device 3 including the engine 30 small in the displacement, a ratio of the vibration suppression torque Tc (amplitude) to the driving torque that can be generated by the engine 30 is high. Therefore, particularly in the case of a gasoline engine, when the engine driving torque is changed in response to the vibration suppression torque Tc, a change amount of the opening degree of a throttle corresponding to the vibration suppression torque Tc is increased, and the air-fuel ratio control of the engine 30 thus becomes difficult. Therefore, the upper/lower limit restriction is imposed on the vibration suppression torque (the upper limit restriction and the lower limit restriction are imposed on the vibration suppression torque Tc).

The upper/lower limit restriction unit 104 is a functional unit configured to impose the upper/lower limit restriction on the vibration suppression torque Tc calculated by the vibration suppression torque calculation unit 102. The upper/lower limit restriction unit 104 is configured to impose the upper/lower limit restriction on the vibration suppression torque Tc based on the upper and lower limit values set by the upper/lower limit value setting unit 103.

The driving torque of the engine 30 is amplified based on the gear ratio of the transmission 31. Thus, when the upper/lower limit restriction imposed on the vibration suppression torque Tc is set depending on the current gear ratio of the transmission 31 for carrying out the sprung vibration damping control, the performance of the sprung vibration damping control can be exerted as much as possible.

In contrast, in a device according to the related art, the upper and lower limit values of the vibration suppression torque are fixed to constant values. In this case, the upper and lower limit values corresponding to the highest gear position having the lowest gear ratio are set so as to secure the basic performance of the engine independently of the set gear position of the transmission. As a result, for example, when the vehicle is traveling at a low speed gear position, despite that the ratio of the vibration suppression torque to the driving torque that can be output by the engine is small, the upper/lower limit restriction imposed on the vibration suppression torque is not relaxed. In other words, even in a state where less change is actually required in the throttle opening degree to generate the vibration suppression torque (during the travel at a low speed gear), the upper/lower limit restriction is uniformly imposed on the vibration suppression torque, and the sprung vibration damping control performance cannot be sufficiently exerted.

Thus, according to this embodiment, the upper/lower limit value setting unit 103 is configured to read the current gear position of the transmission 31, and to acquire the gear ratio determined by this gear position. For a manual transmission, it is only required to read signals from rotational speed sensors configured to respectively detect rotational speeds of an input shaft and an output shaft of the transmission 31, thereby calculating the gear ratio from the ratio of the rotational speeds.

The upper/lower limit value setting unit 103 is configured to calculate, in accordance with Expressions (10) and (11), an upper limit value Tclim$^+$ and a lower limit value Tclim$^-$ of the vibration suppression torque Tc permitted to be generated by the drive device 3.

$$Tclim^+ = Telim^+ \times Rt \times Rd \quad (10)$$

$$Tclim^- = Telim^- \times Rt \times Rd \quad (11)$$

On this occasion, Telim$^+$ is an upper limit value of the vibration suppression torque permitted to be generated in the engine 30, and Telim$^-$ is a lower limit value of the vibration suppression torque permitted to be generated in the engine 30. The upper limit value Telim$^+$ and the lower limit value Telim$^-$ of the engine vibration suppression torque are set to constant values in advance based on the basic performance of the engine 30. Symbol Rt denotes the current gear ratio of the transmission 31. Symbol Rd denotes the gear ratio of the differential device 33. Thus, Rt×Rd represents an overall gear ratio from the engine 30 to the wheel 10.

The vibration suppression torque presents the pulsation waveform in which the positive torque acting in the direction of increasing the driving force of the vehicle and the negative torque acting in the direction of decreasing the driving force of the vehicle alternately appear. Thus, the upper limit value Tclim$^+$ is a positive value, and the lower limit value Tclim$^-$ is a negative value. As appreciated from Expressions (10) and (11), during the travel at the low speed gear where the gear ratio is high, the absolute values of the upper limit value Tclim$^+$ and the lower limit value Tclim$^-$ can be increased (can be large).

The upper limit value Telim$^+$ and the lower limit value Telim$^-$ of the engine vibration suppression torque respectively correspond to the drive source vibration suppression torque upper and lower limit values according to the present invention. Moreover, the overall gear ratio (Rt×Rd) corresponds to the gear ratio acquired by gear ratio acquisition means according to the present invention. In the following, when the upper limit value Tclim and the lower limit value Tclim$^-$ of the vibration suppression torque Tc are not distinguished from each other, the upper limit value Tclim$^+$ and the lower limit value Tclim$^-$ are generally referred to as the upper and lower limit values Tclim.

The upper/lower limit value setting unit 103 is configured to supply the calculated upper and lower limit values Tclim to the upper/lower limit restriction unit 104. The upper/lower limit restriction unit 104 uses the upper and lower limit values Tclim to impose the upper/lower limit restriction on the vibration suppression torque Tc calculated by the vibration suppression torque calculation unit 102. In the following, the vibration suppression torque Tc acquired by imposing the upper/lower limit restriction is referred to as final vibration suppression torque Tc*. For example, the upper/lower limit restriction unit 104 is configured to, in a case in which the vibration suppression torque Tc does not fall within a range between the upper and lower limit values Tclim, set the final vibration suppression torque Tc* to Tclim$^+$ (Tc*=Tclim$^+$) when the vibration suppression torque Tc is a positive value, and set the final vibration suppression torque Tc* to Tclim$^-$ (Tc*=Tclim$^-$) when the vibration suppression torque Tc is a negative value. Moreover, the upper/lower limit restriction unit 104 is configured not to correct the vibration suppression torque Tc in a case where the vibration suppression torque Tc falls within the range between the upper and lower limit values Tclim (Tclim$^-$≤Tc≤Tclim$^+$). In other words, the final vibration suppression torque Tc* is set to a value equal to the vibration suppression torque Tc(Tc*=Tc).

Figure 5:
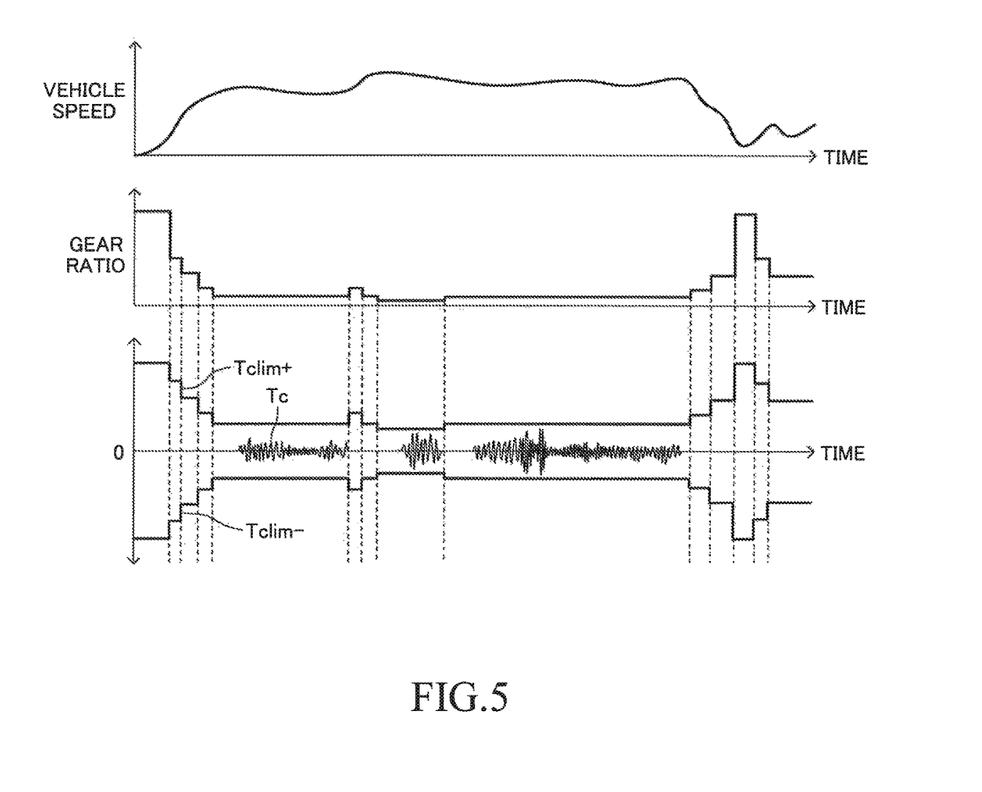
FIG. 5 is a graph for showing transitions of a vehicle speed, a gear ratio, upper and lower limit values, and a vibration suppression torque.

FIG. 5 is a graph for showing transitions of the vehicle speed, the gear ratio Rt of the transmission, the upper and lower limit values Tclim of the vibration suppression torque, and the vibration suppression torque Tc. The transmission 31 of the vehicle according to this embodiment is configured to be able to shift from a first speed at the highest gear ratio to a sixth speed at the lowest gear ratio. As shown in FIG. 5, the upper and lower limit values Tclim (Tclim$^+$ and Tclim$^-$) of the vibration suppression torque Tc are changed in response to the shift of the gear ratio of the transmission 31. In other words, the absolute values of the upper and lower limit values Tclim of the vibration suppression torque Tc are set to be increased (larger) as the gear ratio Rt is increased (larger).

The upper/lower limit restriction unit 104 is configured to store control upper and lower limit values Tclim', which are upper and lower limit values of the final vibration suppression torque Tc*, for prohibiting the excessive sprung vibration damping control, and to use the control upper and lower limit values Tclim' to impose an upper/lower limit restriction on the final vibration suppression torque Tc* when the absolute values of the upper and lower limit values Tclim supplied from the upper/lower limit value setting unit 103 are more than the control upper and lower limit values Tclim', respectively.

Figure 6:
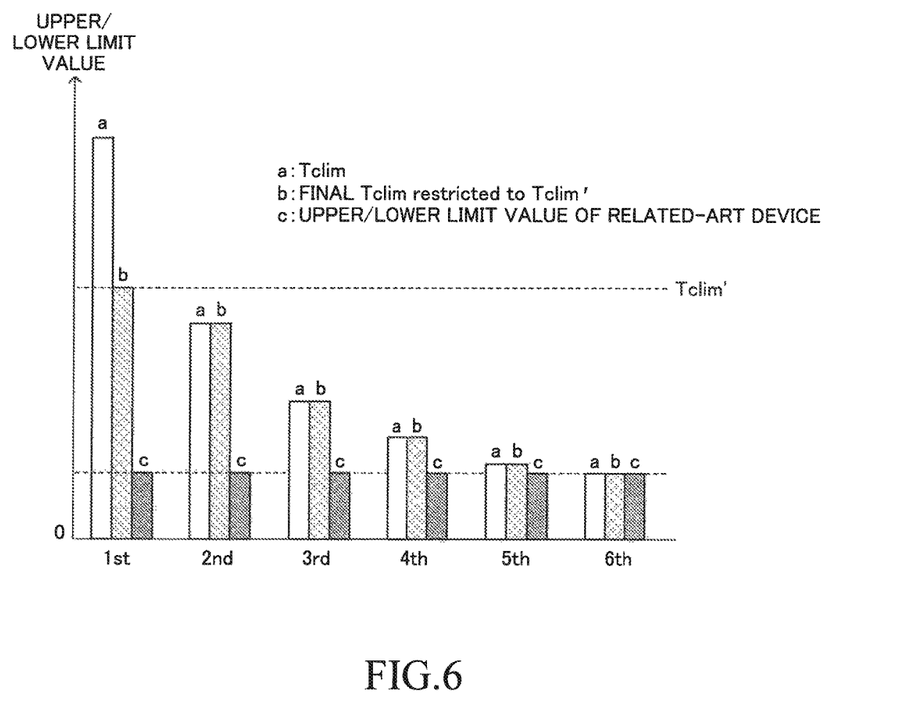
FIG. 6 is a graph for showing upper and lower limit values of the vibration suppression torque, which are set for respective gear positions.

FIG. 6 is a graph for showing the upper and lower limit values of the vibration suppression torque, which are set for the respective gear positions of the transmission 31. According to this embodiment, the absolute values of the upper limit value Tclim and the lower limit value Tclim$^-$ are set to be equal to each other, and, in FIG. 6, the upper limit value Tclim$^+$ and the lower limit value Tclim$^-$ are shown as the absolute value. In the graph, three bars are shown for each of the gear positions. A bar c on the right side represents upper and lower limit values (constant value) in a related-art device. A bar a on the left side represents the upper and lower limit values Tclim set by the upper/lower limit value setting unit 103. A bar b at the center represents the final upper and lower limit values Tclim restricted by the control upper and lower limit values Tclim'. As shown in FIG. 6, at the gear position highest in the gear ratio (first speed), the upper and lower limit values Tclim are more than the control upper and lower limit values Tclim', and the final upper and lower limit values of the vibration suppression torque Tc are restricted to the control upper and lower limit values Tclim'.

The upper/lower limit restriction unit 104 is configured to supply the final vibration suppression torque Tc* acquired by imposing the upper/lower limit restriction to the addition unit 105. The addition unit 105 is configured to add the driver required torque Td calculated by the driver required torque calculation unit 101 and the final vibration suppression torque Tc* subjected to the upper/lower limit restriction by the upper/lower limit restriction unit 104 to each other, and to set the addition result (Td+Tc*) to the target torque. The addition unit 105 is configured to supply the calculated target torque to the control command unit 106.

The control command unit 106 is configured to transmit a control command (e.g., a target throttle opening degree of an electronic throttle) to the actuator of the engine 30 such that the target torque is generated on the drive device 3. In this case, the control command unit 106 calculates a control amount of the engine 30 such that the target torque is output from the drive device 3 based on the gear ratio of the transmission 31 and the driving torque of the engine 30, and to transmit the control command representing the control amount to the actuator. As a result, the drive device 3 generates the target torque, and the vibration of the vehicle body 2 is thus suppressed.

With the driving force control device for a vehicle according to this embodiment described above, the absolute values of the upper and lower limit values Tclim of the vibration suppression torque Tc are set to be increased (larger) as the gear ratio of the transmission 31 is increased (larger). When a constant (the same) vibration suppression torque is generated in a case where the gear ratio of the transmission 31 is changed, a change of the throttle opening degree corresponding to the vibration suppression torque Tc can be decreased as the gear ratio of the transmission 31 is increased. Thus, according to this embodiment, the sprung vibration damping control performance can be exerted as much as possible while the basic performance (e.g., air-fuel ratio) of the engine 30 is maintained. In other words, the sprung vibration damping control performance can be exerted during the travel at the low speed gear by increasing the vibration suppression torque, which has been hitherto restricted unnecessarily during the travel at the low speed gear, to an appropriate value.

In the above, the driving force control device for a vehicle according to this embodiment has been described, but the present invention is not limited to the above-mentioned embodiment, and various changes are possible within the range not departing from the object of the present invention.

For example, according to this embodiment, the vibration suppression torque Tc is calculated through the vehicle kinetic model in the vibration suppression torque calculation unit 102, but, in place of this configuration, there may be provided such a configuration that the vibration state of the vehicle body 2 is actually detected, and the driving torque in the direction of suppressing the vibration of the vehicle body 2 is generated in the drive device 3 based on the detection value. For example, the vibration suppression torque calculation unit 102 may be configured to detect a pitch rate PR of the vehicle body 2, and to set a torque, which is a value acquired by multiplying the pitch rate PR by a predetermined gain G, and which is set to a direction (driving direction or braking direction) of suppressing the pitch vibration of the vehicle body 2, to the vibration suppression torque Tc.

What is claimed is:

1. A driving force control device for a vehicle, comprising:
   a drive device comprising a travel driving source and a transmission and being configured to transmit a driving torque of the travel driving source to a wheel via the transmission, to thereby drive the wheel;
   vibration suppression torque calculation means for calculating a vibration suppression torque for suppressing a sprung vibration to be generated on a vehicle body;
   upper/lower limit restriction means for imposing an upper/lower limit restriction on the calculated vibration suppression torque such that the vibration suppression torque falls within a range limited by upper and lower limit values;
   target torque calculation means for calculating a target torque by adding the vibration suppression torque subjected to the upper/lower limit restriction to a driver required torque, which is set based on an accelerator operation performed by a driver;
   driving torque control means for controlling a driving torque of the drive device based on the target torque;
   gear ratio acquisition means for acquiring a gear ratio of the transmission at a current time; and upper/lower limit value setting means for setting, based on the acquired gear ratio, absolute values of the upper and lower limit values so as to be increased as the gear ratio is increased.

2. A driving force control device for a vehicle according to claim 1, wherein the upper/lower limit value setting means is configured to set the upper and lower limit values respectively by multiplying driving source vibration suppression torque upper and lower limit values, which are upper and lower limit values of the vibration suppression torque permitted to be generated in the travel driving source, by the acquired gear ratio.

* * * * *